May 13, 1969     G. CARTIER     3,444,402
SMALL ELECTRIC MOTORS HAVING PERMANENT MAGNETS
Filed Dec. 20, 1965     Sheet 2 of 2
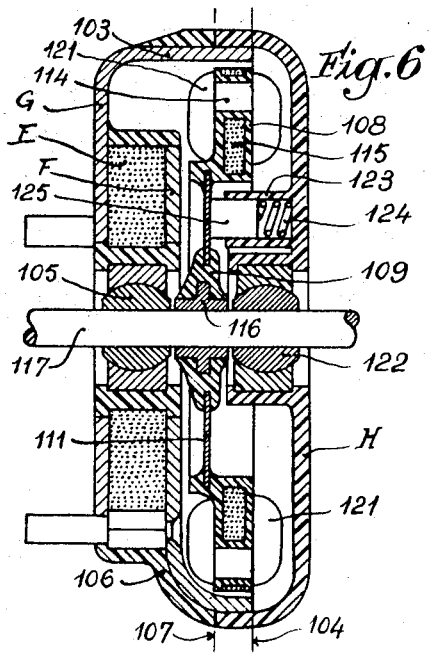
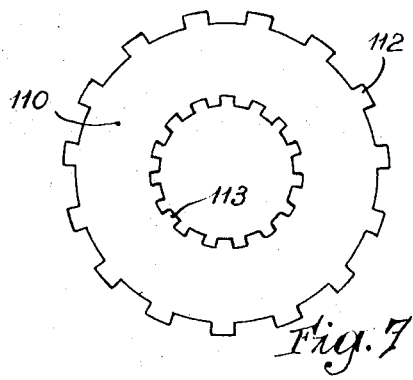
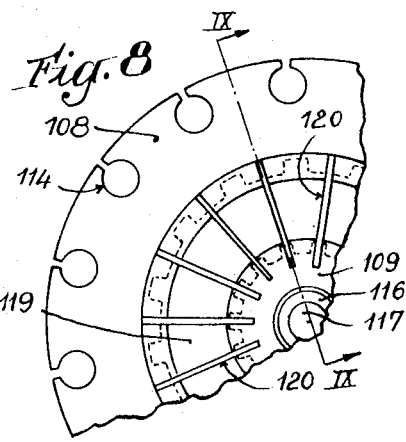
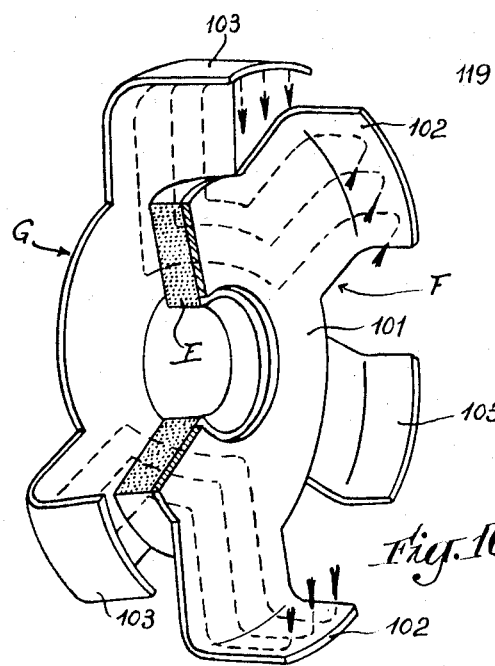
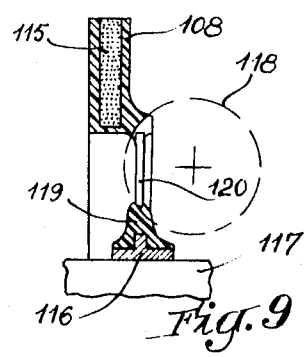
INVENTOR
Gaston Cartier
BY Alexander Dowell
ATTORNEYS United States Patent Office 3,444,402
Patented May 13, 1969

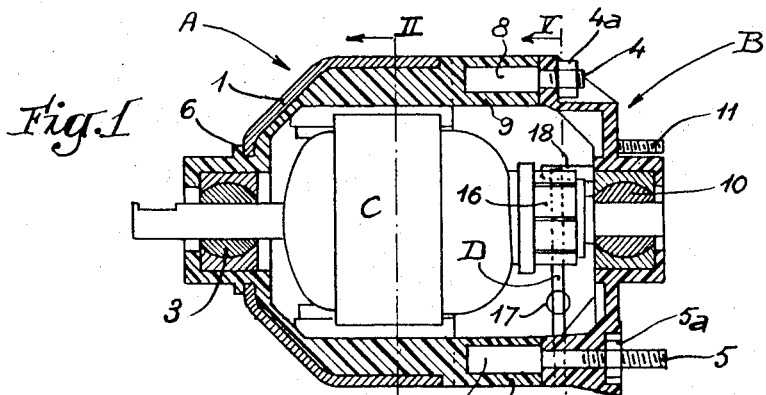
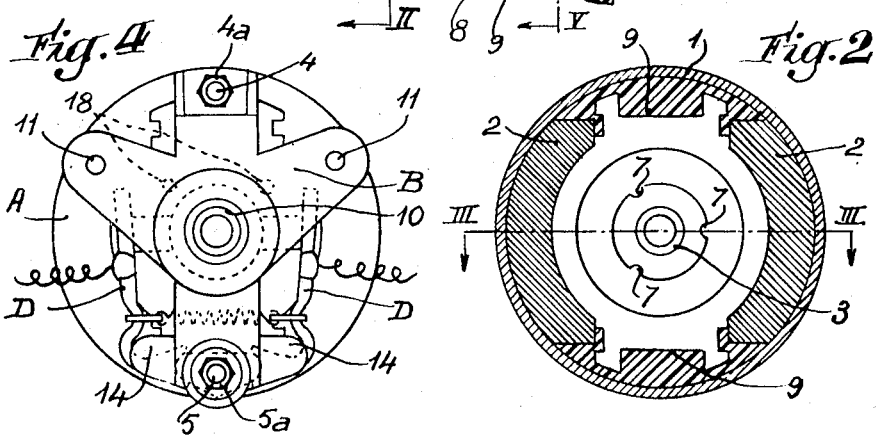
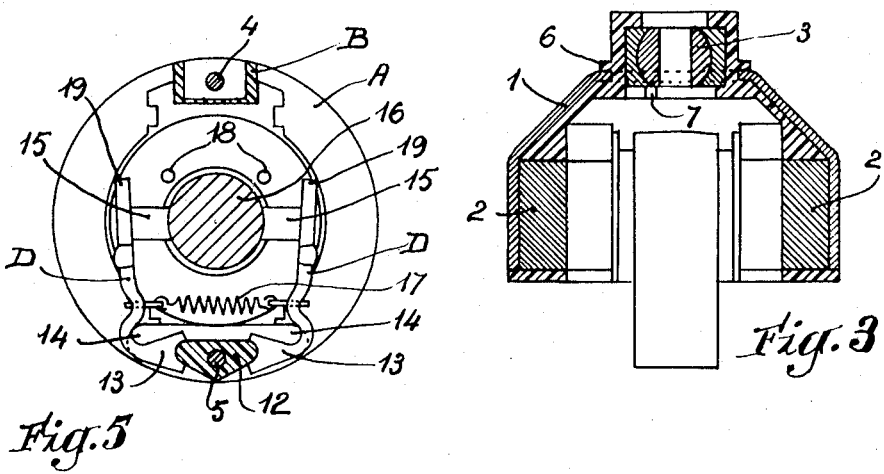

3,444,402
SMALL ELECTRIC MOTORS HAVING
PERMANENT MAGNETS
Gaston Cartier, Ave. de Margencel, Cluses,
Haute-Savoie, France
Filed Dec. 20, 1965, Ser. No. 515,040
Claims priority, application France, Dec. 21, 1964,
45,422; June 10, 1965, 46,095
Int. Cl. H02k 1/04
U.S. Cl. 310—43                                14 Claims

ABSTRACT OF THE DISCLOSURE

An electric motor having a rotor, and having a stator; said stator comprising permanently magnetized magnetic pole pieces; an open-ended plastic moulded shell housing said stator; said shell having a bearing for said rotor, a cap member adapted to close the open end of said shell and having a second bearing for said rotor, a metal shell housing said magnetic pole pieces, and said open-ended plastic shell being fixedly united to and around said metal shell and said magnetic pole pieces.

---

The present invention relates to improvements in electric motors and similar machines and it concerns more particularly, though not exclusively, the case of small direct current motors which are used in the motor industry or in domestic electrical equipment. For known electric motors used for example to drive the windscreen-wipers or the heater fans of motor vehicles, a metal carcase, either solid or built up from a stack of pressed laminations, is generally used with permanent magnets fixed in it. The assembly is held together by mechanical means, that is to say, by the use of nuts and bolts and machined housings. It is understanable that the price of these conventional motors should be high.

The invention aims at reducing the cost of such electric motors without reducing the performance, moreover it allows of producing electric motors which have their axial dimension reduce to a minimum. Motors in accordance with the invention may be designed either for direct or alternating current.

According to this invention an electric motor has a stator comprising permanently magnetised magnetic pole pieces set in an open-ended plastic moulded shell which also provides a bearing or bearing housing for the rotor and a cap member adapted to close the open end of the shell and to provide a second bearing or bearing housing for the rotor.

Preferably, studs embedded in the moulded shell project from the open end thereof to provide a mounting for the cap member, whereby the cap member can be secured on the shell by tightening nuts on the studs.

It is also preferred to provide studs on the shell and/or cap member, whereby the motor can be mounted on a fixture. The cap member may also be moulded in plastic material.

In one method of carrying out the invention the stator comprises a flat annular permanent magnet with north and south faces, which is fixed between two sheet metal pole pieces with castellated peripheries, the protuberances on the peripheries of the pole pieces being bent to form the effective stator pole elements, the protuberances of the two pole pieces alternating around the circumference of the stator. The permanent magnets are preferably made of calcined metal.

It will be understood that such a motor may be manufactured at low cost, the components of the stator coming from the plastic mould ready for mounting, without needing any machine operation.

Two electric motors constructed in accordance with the invention will now be described, by way of example only, with reference to the accompanying drawings, in which:

FIGURE 1 is an axial section through a motor according to the invention,

FIGURE 2 is a sectional view on the line II—II in FIGURE 1 showing only the carcase of the stator, FIGURE 3 is a sectional view on the line III—III in FIGURE 2, FIGURE 4 is an end view of the motor assembly, looking on the brush-carrying end plate, FIGURE 5 is a sectional view on the line V—V in FIGURE 1, FIGURE 6 is an axial section through an electric motor of alternative construction according to the invention, FIGURE 7 shows the metal web of the rotor for the motor of FIGURE 6 by itself, before being surrounded by plastic, FIGURE 8 is a partial front view of the rotor shown in FIGURE 6 ready for winding, FIGURE 9 is a section along the line IX—IX in FIGURE 8 showing the way in which the metal web of the rotor is slit in order to form the commutator of the motor, FIGURE 10 is a perspective view of the pole-pieces of the stator for the motor of FIGURE 6 and the permanent magnet which joins them.

The electric motor shown in FIGURES 1–5 is particularly intended for the motor vehicle industry to drive an accessory such as the windscreen-wipers or the blower fan of a heater. Its stator includes two main components, viz, a carcase A and a brush-carrying end plate B. The carcase A is made up of a metal shell 1, of pressed sheet, inside which there are positioned two permanent magnets 2 of calcined metal, a conventional ball and socket bearing, and two threaded studs 4 and 5 of unequal lengths, the whole being placed in a mould where it is embedded by injecting plastic. The latter forms a kind of shaped case on which the anchorage of the shell 1 is particularly ensured by a flange (FIGURE 1). The retention in place of the bearing 3 is done by three small protuberances 7 which extend radially towards the interior (FIGURE 2).

Each of the threaded studs 4 and 5 has a head 8 which is embedded in the plastic forming two longtiudinal arms which are diametrically opposite and which extend forward beyond the shell 1. The two heads 8 are identical, as are the arms 9, but the length of the threaded projecting portion of stud 5 is greater than that of stud 4.

To perfect the anchorage of the shell 1, it may well be provided in addition with holes or hollows into which the plastic will penetrate at the moment of injection.

The brush-carrying end plate B is also made of injected plastic and a conventional ball and socket bearing 10 is embedded in it, as well as two threaded studs 11 (FIGURE 4). The general shape of this end-plate B is that of a cross of which the vertical arms are perforated at their tips in such a way as to fit over the studs 4 and 5 of the carcase, while the studs 11 are embedded at the tips of the two traverse arms, which are besides tilted upwards (FIGURE 4). Owing to this arrangement, the assembly of the motor after fitting a rotor C is done by simply fitting the end-plate B over the studs 4 and 5. The end plate is fixed by means of the nuts 4a and 5a screwed on to these studs. Owing to the unequal length of the latter, stud 4 does not project appreciably out of nut 4a, while on the contrary, stud 5 juts forward of nut 5a and of the corresponding flat face of the end plate B for a length equal to that of the projecting portions of studs 11.

The portion of stud 5 thus usable defines with the two studs 11 the points of a triangle which allows the motor to be fixed in a conventional manner to the apparatus which is is required to drive.

By another characteristic of the invention, the internal face of the end-plate B includes a profiled abutment 12 on each side of which bear the shaped ends 13 of two brushes D made from pressed sheet. This abutment 12 is placed between two flat faces 14 which project sideways beyond it in such a way as to assure the guidance of the brushes D, which are thus held in place while rocking freely on the abutment 12. Each brush D carries a contact 15 which bears on the commutator 16 of the rotor C, while a tension spring 17 pulls the two brushes D towards each other, being attached to each one at a point between the shaped ends 13 and the brush 15.

Finally, there are provided on the internal face of the end plate B two end-stops 18 which project beyond it longitudinally in order to hold back the tips 19 of the brushes D when the contacts 15 are worn out, thus preventing the metal of the brush from rubbing on the commutator 16.

The example shown in FIGURES 6 to 10 aims at providing particularly a motor which is as flat as possible, intended, for example, to be housed in the door of a car to provide the drive for raising and lowering the windows.

To make the stator of this motor, a permanent magnet E is used, it being made from ferrite, for example, in a flat annular shape. This magnetised ring has a north and south face against each of which a pressed sheet pole piece is fixed. The forward pole-piece F includes a central annular hub 101 from which extend radially three arms which are bent at their ends to form poles 102, having for example, south polarity.

The rear pole-piece G is similar to the foregoing, with the difference that its north poles 103 have a greater axial length than poles 102 to compensate for the thickness of the permanent magnet E. Owing to this arrangement the forward faces of the poles 102 and 103 are all situated in the same transverse plane 104.

To assemble the different components of the stator, a conventional ball and socket bearing is placed in the centre of the assembly shown in FIGURE 10, then plastic is injected directly into place, which surrounds the components and holds them firmly in the required position. In particular, the poles 102 and 103 alternate regularly in the plastic shroud which surrounds them, being flush with its internal wall.

According to an interesting characteristic of the invention, the rotor shroud 106 is limited at a transverse plane 107 which is situated slightly behind the terminal plane 104 of the poles 102 and 103. Owing to this arrangement the projecting portions of the poles 102 and 103 will then serve to centre a plastic cover H which caps the stator E, F, G after the rotor is fitted.

The rotor of the motor according to the invention takes the form of a wheel including a rim 108 and a hub 109, both made of plastic, joined by a metal web 110 (FIGURE 7) which, after reduction (FIGURES 8 and 9), comprises the commutator 111 of the motor (FIGURE 6).

This web 110 is formed by a stamped annular disc of copper provided with external radial projections 112 and internal projections 113 equal in number to the number of winding slots 114 of the rim 108.

The rim 108 is obtained by moulding plastic directly on to the periphery of the web 110, and it surrounds a metal core 115 already stamped for the slots 114. The assembly is then wound in the usual way.

The hub 109 is also made by moulding plastic on to the internal periphery of the web 110, and it surrounds a metal brush 116 in which the shaft of the motor 117 is set.

When the rotor is prepared in this way, it is sufficient to slit the web 110 by means of a mill 118 arranged radially (FIGURE 9) to divide it into a certain number of segments 119 (FIGURE 8) completely separated from one another by the radial slots 120. The whole of the segments 119 constitutes the commutator 111 of the motor, and the corresponding end of the rotor winding wires is soldered to each one.

The cover H which completes the stator of the electric motor is made of plastic injected around a ball and socket bearing 122 of conventional type. This cover includes in particular the cylindrical sleeves 123 pointing axially towards the interior, in each of which a compression spring 124 is placed to hold a carbon or similar brush 125 against the commutator 111.

It will be seen that one of the important characteristics of the motor according to the invention consists of using brushes 125 which are pressed in an axial direction against a commutator 111 arranged in a transverse plane. This arrangement notably allows the brushes 125 and the greater part of the sleeves 123 to be between the rim 108 and the windings 121 of the rotor, which notably reduces the overall length of the motor assembly, as appears clearly in FIGURE 6.

I claim:

1. An electric motor having a rotor, and having a stator; said stator comprising permanently magnetized magnetic pole pieces; an open-ended plastic moulded shell housing said stator; said shell having a bearing for said rotor, a cap member adapted to close the open end of said shell and having a second bearing for said rotor, a metal shell housing said magnetic pole pieces, and said open-ended plastic shell being fixedly united to and around said metal shell and said magnetic pole pieces.

2. In an electric motor as defined in claim 1, studs embedded in said moulded shell and projecting from the open end thereof, said cap member being adapted for mounting on said studs; and nuts engaged on said studs to secure said cap member thereto.

3. An electric motor as defined in claim 1 in which said shell is provided with studs for mounting the motor on a fixture.

4. An electric motor as defined in claim 1, in which said cap member is provided with further studs for mounting the motor on a fixture.

5. An electric motor as defined in claim 1 in which said cap member is formed of plastic material.

6. An electric motor as defined in claim 2, in which ones of said studs projects through said cap member and serves also as a mounting stud for the motor, and at least two additional studs embedded in said cap member project therefrom to provide additional mounting studs for the motor on a fixture.

7. An electric motor as defined in claim 1, in which which said plastic shell has an annular groove and said metal shell has a retaining flange, said retaining flange being engaged in said annular groove.

8. An electric motor as defined in claim 1, in which said stator comprises a flat annular permanent magnet with north and south faces, a sheet metal pole piece fixed on each side of said flat annular permanent magnet, each sheet metal pole piece having a castellated periphery, the protuberances being bent to form effective stator pole elements, the protuberances of one pole piece alternating with the protuberances of the other pole piece around the circumference of said stator.

9. An electric motor as defined in claim 8, in which the rotor comprises a flat wheel consisting of a synthetic resin rim, a synthetic resin hub, and a sheet metal web connecting said rim and said hub, said sheet metal web being slit radially after said rim and hub have been assembled thereon to form a commutator.

10. An electric motor as defined in claim 9, in which said synthetic resin rim is fixed to the metal web, said rim including the metal core having slots therein to receive rotor windings.

11. In an electric motor as defined in claim 9, commutator brushes mounted for axial movement, spring means being connected to said brushes to urge them towards the faces of the commutator.

12. An electric motor as defined in claim 11, in which the cap member is formed with integral open-ended internal housings for reception of said brushes.

13. An electric motor as defined in claim 1, in which said cap member has an internal projection, and a pair of spring-loaded levers carrying commutator brushes fulcrumed on said projection.

14. An electric motor as defined in claim 13, in which said cap member has internal stops engageable by said levers to limit the movement of said levers and prevent direct engagement of the levers with the rotor when the brushes have had excessive wear.

References Cited

UNITED STATES PATENTS

| 2,465,446 | 3/1949 | Gorfin et al. | 310—46 |
| 2,651,834 | 9/1953 | Klym | 310—235 X |
| 2,674,784 | 4/1954 | Roberts et al. | |
| 2,894,156 | 7/1959 | Kent | 310—154 |
| 3,167,675 | 1/1965 | Vindevogel | 310—239 |
| 3,182,218 | 5/1965 | Videtic | 310—239 |

FOREIGN PATENTS 1,197,112   6/1959   France.

WARREN E. RAY, *Primary Examiner.*

U.S. Cl. X.R.

310—46, 154, 235, 237, 244, 247, 257